United States Patent [19]

Newarski

[11] Patent Number: 4,850,092

[45] Date of Patent: Jul. 25, 1989

[54] METHOD OF REMOVING, STORING, RETRIEVING AND LOCALING REASSEMBLY FASTENER ELEMENTS OF AN AUTOMOBILE BEING REPAIRED

[76] Inventor: Emil Newarski, 165 16th Ave., Elmwood Park, N.J. 07407

[21] Appl. No.: 258,495

[22] Filed: Oct. 17, 1988

[51] Int. Cl.4 .............................................. B23P 19/00

[52] U.S. Cl. .................................. 29/426.3; 29/426.5; 29/526.1; 206/457; 206/561; 206/373; 209/702; 446/75; 220/307

[58] Field of Search ................. 29/426.3, 525.1, 426.5, 29/426.6, 402.03, 402.04; 220/307; 206/457, 561, 373; 209/929, 702, 373, 630, 259, 926; 446/75

[56] References Cited

U.S. PATENT DOCUMENTS

| | | | |
|---|---|---|---|
| 1,733,565 | 10/1929 | Tobita | 206/561 |
| 2,621,098 | 12/1952 | Ford et al. | 446/76 X |
| 2,739,697 | 3/1956 | Kuddes | 206/561 |
| 2,903,127 | 9/1959 | Dorman | 206/338 |
| 3,263,320 | 8/1966 | Jones | 29/426.5 X |
| 3,327,688 | 6/1967 | Smith | 206/214 |
| 3,618,749 | 11/1971 | Vaccaro | 206/373 X |
| 3,650,397 | 3/1972 | Bornemeier | 209/929 X |
| 4,084,695 | 4/1978 | Halbich | 206/561 X |
| 4,353,694 | 10/1982 | Pelerin | 206/561 X |
| 4,490,897 | 1/1985 | Forre | 29/426.5 X |
| 4,527,688 | 7/1985 | Jones et al. | 446/76 X |
| 4,615,112 | 10/1986 | Shannon | 209/929 X |
| 4,643,316 | 2/1987 | Hoffman | 206/561 X |
| 4,700,829 | 10/1987 | Goodyear | 206/214 |
| 4,753,346 | 6/1988 | Tsuji | 206/457 X |

FOREIGN PATENT DOCUMENTS

| | | | |
|---|---|---|---|
| 751562 | 7/1980 | U.S.S.R. | 29/402.3 |
| 2174366 | 11/1986 | United Kingdom | 206/373 |

*Primary Examiner*—Charlie T. Moon

*Attorney, Agent, or Firm*—Mark T. Basseches; Paula T. Basseches

[57] ABSTRACT

A classifying receptacle for the temporary storage of automobile fasteners and method of employing the same is disclosed. The receptacle comprises a replica of an automobile and includes storage compartments correlated positionwise on the receptacle to the likely location of fasteners to be removed from an actual automobile. The receptacle is used by disposing parts removed from the automobile in the compartments of the receptacle most closely analogous to the location from which the fasteners were removed from the actual automobile, reassociation of the removed fasteners with the automobile being expedited by reference to locations within the receptacle corresponding to complemental locations on the actual automobile.

2 Claims, 1 Drawing Sheet

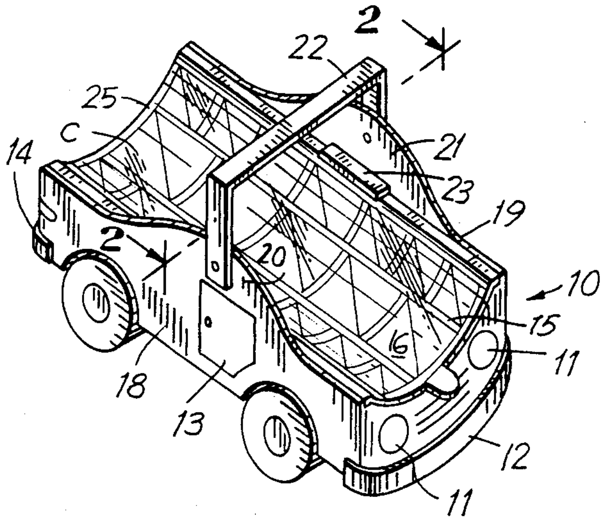
FIG. 1
FIG. 2
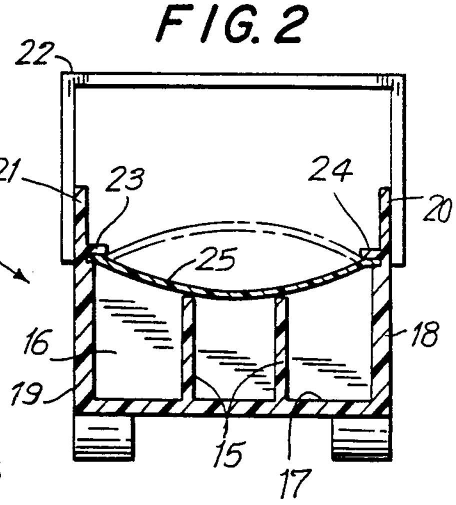
FIG. 3
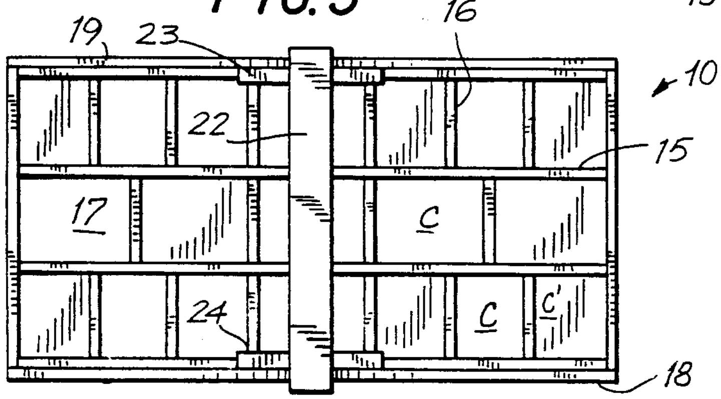

METHOD OF REMOVING, STORING, RETRIEVING AND LOCALING REASSEMBLY FASTENER ELEMENTS OF AN AUTOMOBILE BEING REPAIRED

BACKGROUND OF THE INVENTION

1. Field of the Invention

The present invention relates to a classifying receptacle and method of using the same and is more particularly directed to a receptacle intended to be used in auto body repair shops and to the method of employing the same.

2. Prior Art

In the repair of automobiles and particularly body damage thereto it is often required that components of the automobile to be refinished or replaced be disassembled from the main body of the automobile. In cases where an automobile is significantly damaged, for instance, it is frequently necessary to disassemble headlight, trim, front grille structures, fenders, etc. for a significant time period for painting or obtaining replacements for such components.

Typically the components are secured to the automobile chassis or structures mounted thereon by a variety of bolts, nuts, spacers, washers, sheet metal screws, insulators, gaskets and the like. Such components may often become lost during the period between disassembly and reassembly. Even if such devices (hereinafter, for convenience, referred to generically as "fasteners") are carefully stowed, it is extremely difficult for the repairing mechanic properly to reassociate the fasteners in their correct positions on the automobile.

The problem is exacerbated by the fact that often the mechanic who must reassemble automobile components is unfamiliar with the original construction due to a lapse of time or to the fact that a different mechanic has performed the disassembly. As a result, there frequently remain at the conclusion of a repair numerous parts or elements which were formerly part of the automobile but whose function or position was not understood by the mechanic and, hence, are discarded.

SUMMARY OF THE INVENTION

The present invention may be summarized as directed to a novel, classifying receptacle and method of using the same which is particularly adapted for use in automotive body repair shops.

The invention is characterized by the provision of a receptacle in the configuration of a automobile, the receptacle being subdivided into a plurality of distinct storage compartments, the location of the storage compartments in respect of the receptacle being correlated to various positions on the actual automobile.

Thus, a worker disassembling a left front headlight fixture, for example, will be enabled to deposit the fasteners relating to the headlight assembly of the actual automobile in a compartment of the receptacle juxtaposed to a replication of the left front headlight appearing on the receptacle.

In this manner the fasteners removed from the automobile are readily reoriented in their correct positions on the automobile by reference to the location of the compartment within the receptacle corresponding to the location of the portion of the automobile being repaired.

The invention further relates to a receptacle of the type described having a novel covering arrangement which may be readily removed and replaced and which will reliably close all of the compartments of the receptacle.

Still more particularly, the invention relates to a method of storing, retrieving and locating for reassembly components from an automobile being repaired whereby the location of parts removed from an automobile may be readily re-established at the time of reassembly.

Accordingly, it is an object of the invention to provide a classifying assembly for the temporary storage of automotive fasteners and method of employing the same which expedites the repair of an automobile by greatly simplifying the reassociation of parts removed from an automobile in their proper locations.

BRIEF DESCRIPTIONS OF THE DRAWINGS

FIG. 1 is a perspective view of a receptacle in accordance with the invention;

FIG. 2 is a vertical section taken on the line 2—2 of FIG. 1;

FIG. 3 is a top plan view of the receptacle in accordance with the invention with the cover portion removed.

DETAILED DESCRIPTION OF THE DRAWINGS

Referring now to the drawings, there is disclosed in FIG. 1 a receptacle 10 in the general configuration of an automobile, including such identifying indicia as headlights 11, front bumper 12, side door or doors 13, rear bumper 14, as to enable a mechanic to associate or correlate the receptacle with the corresponding components of a conventional automobile.

As used herein, the term "automobile" is to be broadly construed so as to encompass, for instance, a truck, boat, etc.

As best seen in FIGS. 2 and 3, the interior of the receptacle 10 is subdivided into a plurality of compartments C by a series of longitudinally and transversely directed walls 15, 16 respectively, extending upwardly from the floor 17 of the receptacle. The side walls of the receptacle are defined by members 18, 19, the receptacle being preferably formed of a rigid polymeric material which may be vacuum formed or injection molded as a single unit and which may preferably be of transparent or translucent material. For convenience, the side walls 18, 19 may include upwardly directed extensions 20, 21, to which a bail or handle 22 may be attached.

In accordance with a preferred embodiment, longitudinally directed ledge members 23, 24 extend inwardly in slightly overlying relation from the side walls to which they are appended, for purposes which will appear hereinafter.

Preferably the compartments C, which include upwardly open mouth portions, are of a height such that the upper surfaces of the mouth portions define or lie on a transverse arc.

In such constructions there may be provided a flexible transparent sheet 25 adapted simultaneously to seal all of the compartments when deflected to a downwardly convex condition, as shown in solid lines, FIG. 2.

The sheet 25 may be secured to the receptacle by bowing the same to an upwardly convex condition (see dash lines FIG. 2), inserting the margins beneath the ledges 23, 24 and thereafter snapping the sheet downwardly to the solid line position shown in FIG. 2.

The sheet may be disposable and, hence, may be labeled to identify the particular automobile the parts of which are being stowed.

In use, a mechanic will remove fasteners from an automobile to be repaired and will stow the fasteners within the compartment C most closely related to the position which such fasteners occupied in the actual automobile. For instance, fasteners retaining the trim which supports the right front headlight may be stowed in compartment C', etc. When it is time to reassemble the automobile being repaired, the mechanic may simply remove cover 25 and remount the repaired or replaced components, selecting from the receptacle the fasteners located in the compartment or compartments of the receptacle most closely related to the position on the car of the components to be reassembled.

Thus, for example, a mechanic replacing a right front headlight trim would immediately recognize that the appropriate fasteners were located in compartment C'.

By virtue of the novel receptacle in accordance with the invention and the method of using the same, an automobile repair mechanic is enabled safely to stow fasteners from an automobile being repaired and readily retrieve the correct fasteners for reassembly. Thus, the receptacle greatly expedites the accurate reassembly of automotive components and assures that the fasteners will not be discarded merely because the mechanic is unable to ascertain the correct location of such fasteners.

As will be appreciated from the preceding, there is described in accordance with the invention a novel receptacle and a method of using the same which is of particular utility in the automotive body repair industry.

As will be apparent to those skilled in the art and familiarized with the instant disclosure, numerous variations in details of construction may be made without departing from the spirit of the invention. Accordingly, the same is to be broadly construed within the scope of the appended claims.

Having thus described the invention and illustrated its use, what is claimed as new and is desired to be secured by Letters Patent is:

1. The method of storing, retrieving and locating for reassembly fastener elements of an automobile being repaired which comprises the steps of providing a container comprised of a simulation of an automobile, said container including a plurality of internal compartments located with respect to said container to correspond substantially with the location of said fastener elements of an automobile, removing fasteners from said selected locations of an automobile being repaired, disposing said fasteners removed from said automobile in respective said compartments of said container corresponding most closely to the locations on said automobile from which said fasteners were removed and thereafter retrieving said fasteners for reassembly to said automobile by reference to the compartments of said container most closely related to the location on said automobile of said fasteners.

2. The method of claim 1 wherein said compartments include upwardly open mouth portions, said receptacle including a cover member mountable over said mouth portions for closing the same.

* * * * *